(12) United States Patent
Hwang et al.

(10) Patent No.: US 9,888,061 B2
(45) Date of Patent: Feb. 6, 2018

(54) METHOD FOR ORGANIZING HOME SCREEN AND ELECTRONIC DEVICE IMPLEMENTING THE SAME

(71) Applicant: Samsung Electronics Co., Ltd., Suwon-si, Gyeonggi-do (KR)

(72) Inventors: Minkyung Hwang, Seoul (KR); Yongjoon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 14/711,263

(22) Filed: May 13, 2015

(65) Prior Publication Data

US 2015/0339036 A1    Nov. 26, 2015

(30) Foreign Application Priority Data

May 26, 2014   (KR) .................. 10-2014-0063035

(51) Int. Cl.
| | | |
|---|---|---|
| *G06F 3/048* | (2013.01) | |
| *H04L 29/08* | (2006.01) | |
| *G06F 9/44* | (2006.01) | |
| *G06F 3/0482* | (2013.01) | |
| *G06F 3/0481* | (2013.01) | |
| *H04M 1/725* | (2006.01) | |
| *G06F 3/0488* | (2013.01) | |

(52) U.S. Cl.
CPC ............ *H04L 67/10* (2013.01); *G06F 3/0482* (2013.01); *G06F 3/04817* (2013.01); *G06F 9/4443* (2013.01); *H04M 1/72519* (2013.01); *G06F 3/0488* (2013.01); *H04M 2250/22* (2013.01)

(58) Field of Classification Search
CPC ....... G06F 3/0416; G06F 3/04817; G06F 8/38
See application file for complete search history.

(56) References Cited

U.S. PATENT DOCUMENTS

| | | | |
|---|---|---|---|
| 2010/0088597 A1* | 4/2010 | Shin .......................... | G06F 8/38 715/704 |
| 2010/0146430 A1 | 6/2010 | Karimaki | |
| 2010/0295789 A1 | 11/2010 | Shin et al. | |
| 2014/0040797 A1 | 2/2014 | Qian | |
| 2014/0055388 A1* | 2/2014 | Yook ..................... | G06F 3/0416 345/173 |
| 2014/0201655 A1* | 7/2014 | Mahaffey ............ | G06F 3/04817 715/765 |
| 2015/0169211 A1 | 6/2015 | Shin et al. | |

FOREIGN PATENT DOCUMENTS

| | | |
|---|---|---|
| EP | 2 701 054 A2 | 2/2014 |
| KR | 10-2010-0037944 A | 4/2010 |

* cited by examiner

*Primary Examiner* — Haoshian Shih
(74) *Attorney, Agent, or Firm* — Jefferson IP Law, LLP

(57) ABSTRACT

An electronic device and a method for constructing a home screen thereof are provided. the method includes recognizing an editing gesture input with regard to a selected application icon, activating an editing mode in response to the editing gesture input, displaying an application list corresponding to the selected application icon in the editing mode, recognizing a selection of at least one of graphical components including widgets and icons, arranged in the displayed application list, and displaying the at least one selected graphical component on at least one page of the home screen.

19 Claims, 10 Drawing Sheets

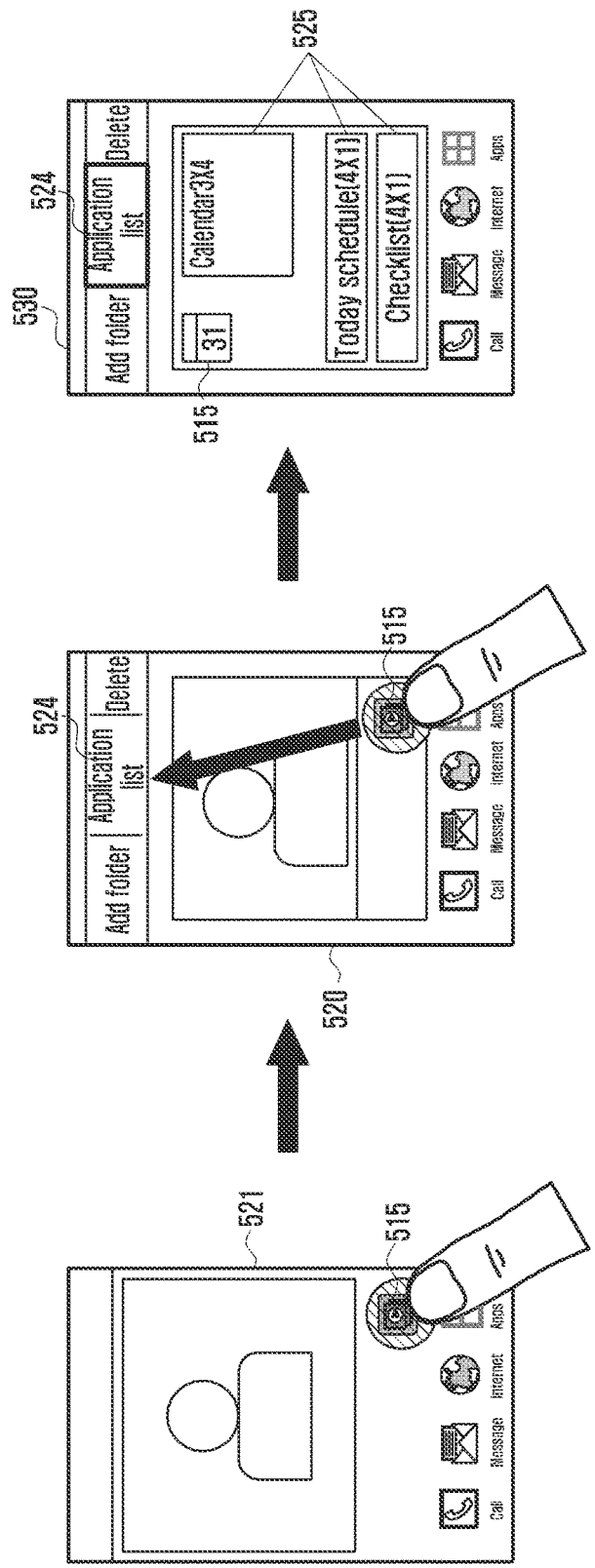

METHOD FOR ORGANIZING HOME SCREEN AND ELECTRONIC DEVICE IMPLEMENTING THE SAME

CROSS-REFERENCE TO RELATED APPLICATION(S)

This application claims the benefit under 35 U.S.C. § 119(a) of a Korean patent application filed on May 26, 2014 in the Korean Intellectual Property Office and assigned Serial number 10-2014-0063035, the entire disclosure of which is hereby incorporated by reference.

TECHNICAL FIELD

The present disclosure relates to a method for organizing a home screen and an electronic device implementing the same. More particularly, the present disclosure relates to a method for displaying graphical components, such as widgets and icons, on a home screen of an electronic device and the electronic device thereof.

BACKGROUND

Currently, electronic devices have the ability to execute a great variety of numerous applications. Further, electronic devices usually offer graphic components, such as widgets and icons on the home screen so that users can use and manage applications conveniently.

A typical home screen, however, often requires many input operations when users desire to manage various applications on the home screen. Unfortunately, this causes much inconvenience to users.

Therefore, a need exists for a method for displaying graphical components, such as widgets and icons, on a home screen of an electronic device and the electronic device thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for displaying graphical components, such as widgets and icons, on a home screen of an electronic device and the electronic device thereof.

In accordance with an aspect of the present disclosure, a method for constructing a home screen of an electronic device is provided. The method includes recognizing an editing gesture input with regard to a selected application icon, activating an editing mode in response to the editing gesture input, displaying an application list corresponding to the selected application icon in the editing mode, recognizing a selection of at least one of graphical components, including widgets and icons, arranged in the displayed application list, and displaying the at least one selected graphical component on at least one page of the home screen.

In accordance with another aspect of the present disclosure, an electronic device is provided. The electronic device includes a display unit including a display module configured to display a home screen having a plurality of pages and to display graphical components, having widgets and icons, of applications, a memory unit configured to store therein the applications and the graphical components, and a processor configured to recognize an editing gesture input with regard to a selected application icon, to activate an editing mode in response to the editing gesture input, to control the display module to display an application list corresponding to the selected application icon in the editing mode, to recognize a selection of at least one of graphical components, including widgets and icons, arranged in the displayed application list, and to control the display module to display the at least one selected graphical component on at least one page of the plurality of pages of the home screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates screenshots illustrating a process of displaying a widget and an icon of an application according to various embodiments of the present disclosure.

Throughout the drawings, it should be noted that like reference numbers are used to depict the same or similar elements, features, and structures.

DETAILED DESCRIPTION

Figure 1:
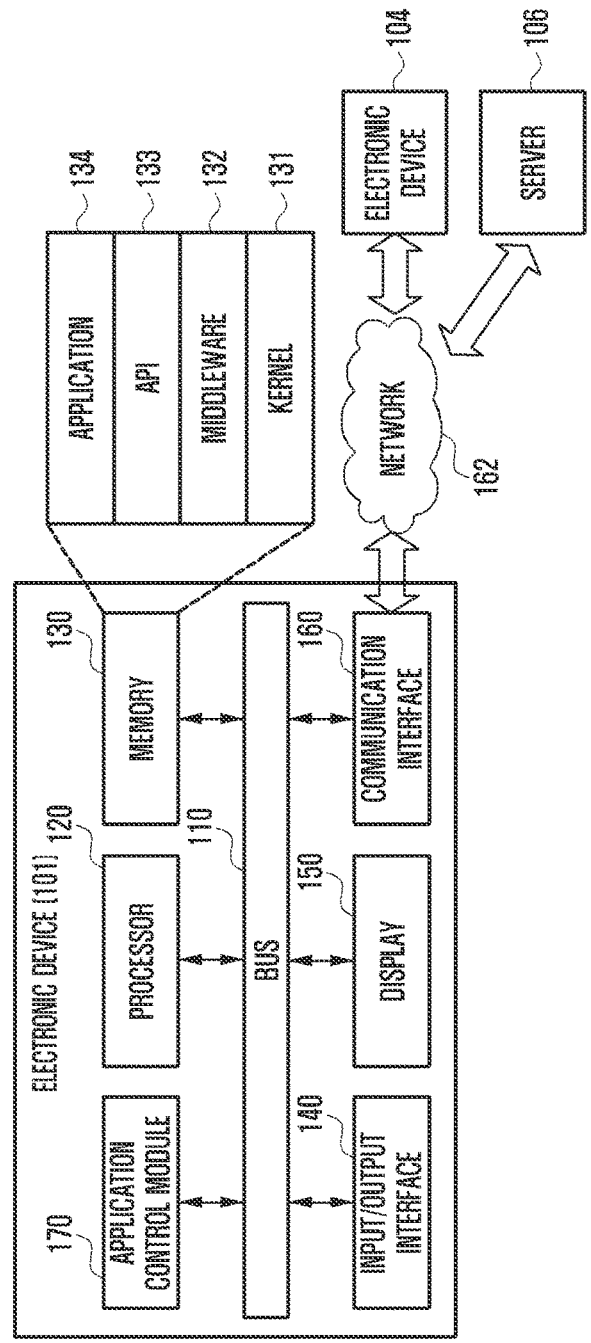
FIG. 1 is a block diagram illustrating a network environment including therein an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in various embodiments of the present disclosure denote the presence of the disclosed functions, operations, and constituent elements and do not limit one or more additional functions, operations, and constituent elements. In various embodiments of the present disclosure, the terms, such as "include" and/or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In various embodiments of the present disclosure, the expression "and/or" includes any and all combinations of the associated listed words. For example, the expression "A and/or B" may include A, may include B, or may include both A and B.

In various embodiments of the present disclosure, expressions including ordinal numbers, such as "first" and "second," and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., a Moving Picture Experts Group (MPEG-1 or MPEG-2) Audio Layer 3 (MP3) player), a mobile medical device, a camera, or a wearable device. Examples of the wearable device are a head-mounted-device (HMD) (e.g., electronic eyeglasses), electronic clothing, an electronic bracelet, an electronic necklace, an appcessory, an electronic tattoo, a smart watch, and the like.

The electronic device according to the various embodiments of the present disclosure may be smart home appliances. Examples of the smart home appliances are a television (TV), a Digital Versatile Disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to the various embodiments of the present disclosure may include at least one of the following: medical devices (e.g., Magnetic Resonance Angiography (MRA), Magnetic Resonance Imaging (MRI), Computed Tomography (CT), a scanning machine, an ultrasonic scanning device, and the like), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, and the like), avionics, a security device, a head unit for vehicles, an industrial or home robot, an automatic teller's machine (ATM), a point of sales (POS) system, and the like.

The electronic device according to the various embodiments of the present disclosure may include at least one of the following: furniture or a portion of a building/structure, an electronic board, an electronic signature receiving device, a projector, various measuring instruments (e.g., a water meter, an electric meter, a gas meter and a wave meter), and the like, respectively. The electronic device according to the various embodiments of the present disclosure may also include a combination of the devices listed above. In addition, the electronic device according to the various embodiments of the present disclosure may be a flexible device. It is obvious to those skilled in the art that the electronic device according to the various embodiments of the present disclosure is not limited to the aforementioned devices.

Hereinafter, electronic devices according the various embodiments of the present disclosure are described with reference to the accompanying drawings. In the description, the term a 'user' may be referred to as a person or a device that uses an electronic device, e.g., an artificial intelligent electronic device.

FIG. 1 is a block diagram illustrating a network environment including an electronic device according to various embodiments of the present disclosure.

Referring to FIG. 1, an electronic device 101 may include a bus 110, a processor 120, a memory 130, an input/output (I/O) interface 140, a display 150, a communication interface 160, and an application control module 170.

The bus 110 may be a communication circuit that connects the components to each other and transfers data (e.g., control messages) between the components.

The processor 120 may receive instructions from the components (e.g., the memory 130, input/output interface 140, display 150, communication interface 160, application control module 170, and the like) via the bus 110, decode them and perform corresponding operations or data processing according to the decoded instructions.

The memory 130 may store instructions or data transferred from/created in the processor 120 or the other components (e.g., the input/output interface 140, display 150, communication interface 160, application control module 170, and the like). The memory 130 may include programming modules, e.g., a kernel 131, middleware 132, application programming interface (API) 133, application module 134, and the like. Each of the programming modules may be software, firmware, hardware or a combination thereof.

The kernel 131 may control or manage system resources (e.g., the bus 110, processor 120, memory 130, and the like) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling, load balancing) for task requests transmitted from the application module 134 by methods, for example, a method for assigning the order of priority to use the system resources (e.g., the bus 110, processor 120, memory 130, and the like) of the electronic device 101 to at least one of the applications of the application module 134.

The API 133 is an interface that allows the application module 134 to control functions of the kernel 131 or middleware 132. For example, the API 133 may include at least one interface or function (e.g., an instruction) for file control, window control, character control, video process, and the like.

In various embodiments of the present disclosure, the application module 134 may include applications that are related to: Short Message Service (SMS)/Multimedia Messaging Service (MMS), email, calendar, alarm, health care (e.g., an application for measuring the blood sugar level, a workout application, and the like), environment information (e.g., atmospheric pressure, humidity, temperature, and the like), and so on. The application module 134 may be an application related to exchanging information between the electronic device 101 and the external electronic devices (e.g., another electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, and the like), to an external electronic device (e.g., the other electronic device 104). In addition, the notification relay application may receive notification information from an external electronic device (e.g., the other electronic device 104) and provide the notification information to the user. The device management application can manage (e.g., to install, delete, or update): part of the functions of an external electronic device (e.g., the other electronic device 104) communicating with the electronic device 101, e.g., turning on/off the external electronic device, turning on/off part of the components of the external electronic device, adjusting the brightness (or the display resolution) of the display of the external electronic device, and the like, applications operated in the external electronic device, or services from the external electronic device, e.g., call service or messaging service, and the like.

In various embodiments of the present disclosure, the application module 134 may include applications designated according to attributes (e.g., a type of electronic device) of the external electronic device (e.g., the other electronic device 104). For example, if the external electronic device is an MP3 player, the application module 134 may include an application related to music playback. If the external electronic device is a mobile medical device, the application module 134 may include an application related to health care. In an embodiment of the present disclosure, the application module 134 may include at least one of the following: an application designated in the electronic device 101 and applications transmitted from external electronic devices (e.g., a server 106, the other electronic device 104, and the like).

The input/output interface 140 may receive instructions or data from the user via an input/output system (e.g., a sensor, keyboard or touch screen) and transfers them to the processor 120, memory 130, communication interface 160 or application control module 170 through the bus 110. For example, the input/output interface 140 may provide data corresponding to a user's touch input to a touch screen to the processor 120. The input/output interface 140 may receive instructions or data from the processor 120, memory 130, communication interface 160 or application control module 170 through the bus 110, and output them to an input/output system (e.g., a speaker or a display). For example, the input/output interface 140 may output voice data processed by the processor 120 to the speaker.

The display 150 may display various types of information (e.g., multimedia data or text data) to a user.

The communication interface 160 may communicate between the electronic device 101 and an external system (e.g., the other electronic device 104 or the server 106). For example, the communication interface 160 may connect to a network 162 in wireless or wired mode and communicate with the external system. Wireless communication may include at least one of the following: Wireless Fidelity (Wi-Fi), Bluetooth (BT), near field communication (NFC), GPS or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM), and the like). Wired communication may include at least one of the following: universal serial bus (USB), high definition multimedia interface (HDMI), recommended standard 232 (RS-232), plain old telephone service (POTS), and the like.

In an embodiment of the present disclosure, the network 162 may be a telecommunication network. The telecommunication network may include at least one of the following: a computer network, Internet, Internet of things, telephone network, and the like. The protocol for communication between the electronic device 101 and the external system, e.g., transport layer protocol, data link layer protocol, or physical layer protocol, may be supported by at least one of the following: application module 134, API 133, middleware 132, kernel 131 and communication module 160.

The application control module 170 may process at least a part of the information acquired from other components (e.g., the processor 120, the memory 130, the input/output interface 140, and the communication interface 160) and provides the user with the processing result in various ways.

For example, the application control module 170 may control a part of the functions of the electronic device 101 in order for the electronic device 101 to interoperate with other electronic device (e.g., the other electronic device 104 and the server 106). According to an embodiment of the present disclosure, at least a part of the application control module 170 may be included in the server 106 such that at least one of the operations of the application control module 170 can be supported by the server 106.

Figure 2:
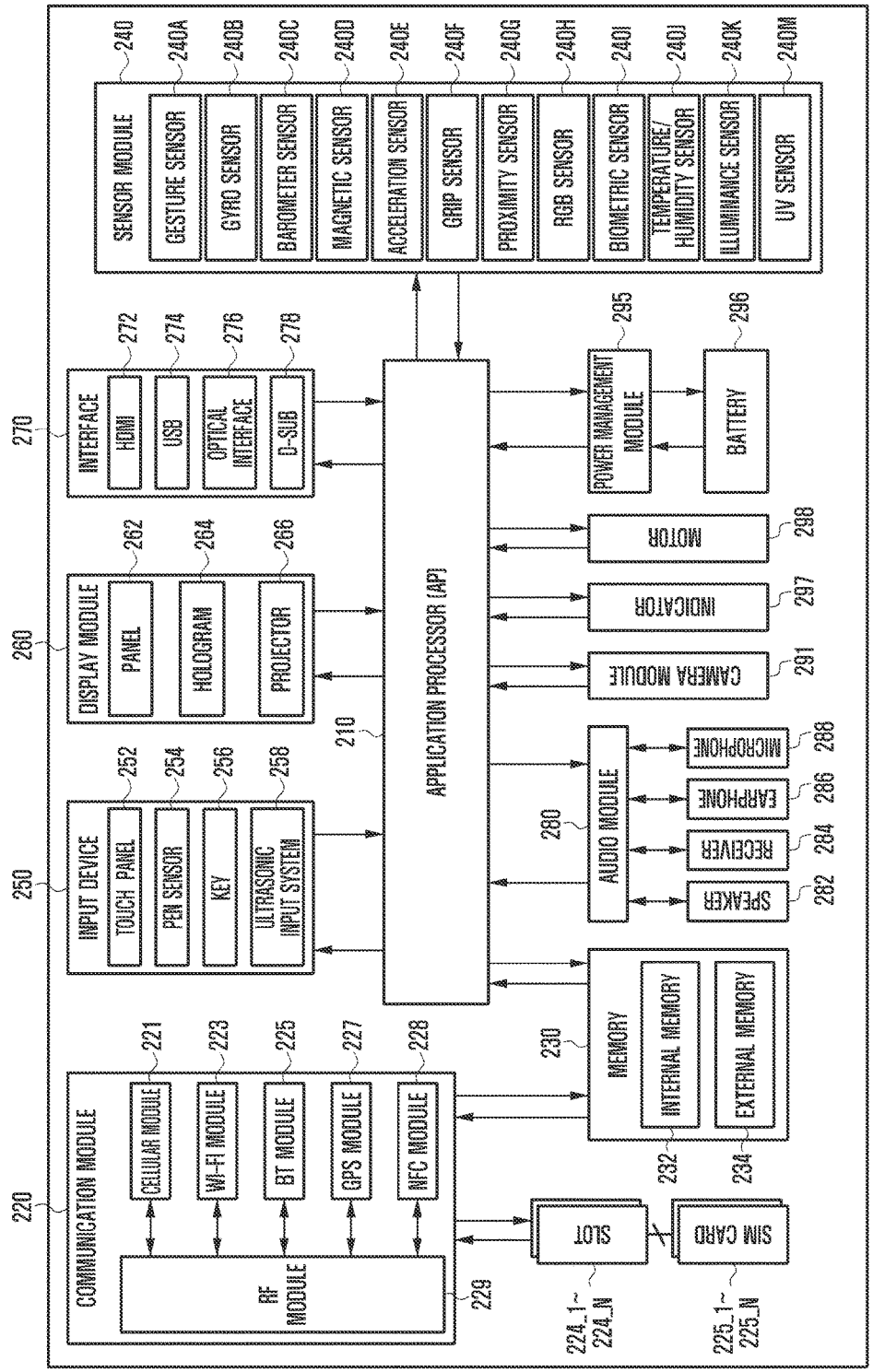
FIGS. 2 and 3 are block diagrams illustrating an electronic device according to various embodiments of the present disclosure.

FIG. 2 illustrates a block diagram of an electronic device according to various embodiments of the present disclosure. The electronic device may be part or all of electronic device 101 as shown in FIG. 1.

Referring to FIG. 2, the electronic device may include one or more processors of the application processor 210, a communication module 220, a subscriber identification module (SIM) card 224, a memory 230, a sensor module 240, an input system 250, a display module 260, an interface 270, an audio module 280, a camera module 291, a power management module 295, a battery 296, an indicator 297, and a motor 298.

The application processor (AP) 210 may control a number of hardware or software components connected thereto by executing the operation system or applications, process data including multimedia data, and perform corresponding operations. The AP 210 may be implemented with a system on chip (SoC). In an embodiment of the present disclosure, the AP 210 may further include a graphical processing unit (GPU).

The communication module 220 (e.g., the communication interface 160) performs communication for data transmission/reception between the other electronic devices (e.g., the other electronic device 104, the server 106, and the like) that are connected to the electronic device (e.g., the electronic device 101) via the network. In an embodiment of the present disclosure, the communication module 220 may include a cellular module 221, a Wi-Fi module 223, a BT module 225, a GPS module 227, an NFC module 228 and a radio frequency (RF) module 229.

The cellular module 221 may provide voice call, video call, SMS or Internet service, and the like, via a communication network (e.g., LTE, LTE-A, CDMA, WCDMA, UMTS, Wi-Bro, GSM, and the like). The cellular module 221 may perform identification or authentication for electronic devices in a communication network by using their subscriber identification module (e.g., the SIM card 224). In an embodiment of the present disclosure, the cellular module 221 may perform part of the functions of the AP 210. For example, the cellular module 221 may perform part of the functions for controlling multimedia.

In an embodiment of the present disclosure, the cellular module 221 may include a communication processor (CP). The cellular module 221 may be implemented with, for example, an SoC. Although the embodiment of the present disclosure shown in FIG. 2 is implemented in such a way that the cellular module 221 (e.g., communication processor), the power management module 295, the memory 230, and the like, are separated from the AP 210, an embodiment of the present disclosure can be modified in such a way that the AP 210 includes at least part of those (e.g., cellular module 221).

In an embodiment of the present disclosure, the AP 210 or the cellular module 221 (e.g., communication processor) may load instructions or data transmitted from at least one of the following: non-volatile memory or other components, on a volatile memory and then process them. The AP 210 or the cellular module 221 may also store data in a non-volatile memory, which is transmitted from/created in at least one of the other components.

The Wi-Fi module 223, the BT module 225, the GPS module 227 and the NFC module 228 may include processors for processing transmission/reception of data, respectively. Although the embodiment of the present disclosure shown in FIG. 2 is implemented in such a way that the cellular module 221, Wi-Fi module 223, BT module 225, GPS module 227, and NFC module 228 are separated from each other, an embodiment of the present disclosure can be modified in such a way that part of those (e.g., two or more) are included in an integrated chip (IC) or an IC package. For example, part of the processors corresponding to the cellular module 221, Wi-Fi module 223, BT module 225, GPS module 227, and NFC module 228, e.g., a communication processor corresponding to the cellular module 221 and a Wi-Fi processor corresponding to the Wi-Fi 223, may be implemented with an SoC.

The RF module 229 may transmit or receive data, e.g., RF signals. The RF module 229 may include a transceiver, a power amplifier module (PAM), a frequency filter, a low noise amplifier (LNA), and the like. The RF module 229 may also include parts for transmitting/receiving electromagnetic waves, e.g., conductors, wires, and the like, via free space during wireless communication. Although the embodiment of the present disclosure shown in FIG. 2 is implemented in such a way that the cellular module 221, Wi-Fi module 223, BT module 225, GPS module 227, and NFC module 228 share the RF module 229, an embodiment of the present disclosure can be modified in such a way that at least one of those transmits or receives RF signals via a separate RF module.

The SIM card 224 may be a card with a SIM. SIM cards 225-1 to 225-N may be fitted into slots 224-1 to 224-N of the electronic device. The SIM card 224 may include unique identification information, e.g., integrated circuit card identifier (ICCID), or subscriber information, e.g., international mobile subscriber identity (IMSI).

The memory 230 (e.g., the memory 130) may include a built-in memory 232 and/or an external memory 234. The built-in memory 232 may include at least one of the following: volatile memory, e.g., dynamic RAM (DRAM), static RAM (SRAM), synchronous dynamic RAM (SDRAM), and the like, non-volatile memory, e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, and the like.

In an embodiment of the present disclosure, the built-in memory 232 may be a Sold State Drive (SSD). The external memory 234 may further include a flash drive, e.g., compact flash (CF), secure digital (SD), micro-SD (micro-SD), mini-SD (mini-SD), extreme digital (XD), a memory stick, and the like. The external memory 234 may be functionally connected to the electronic device via various types of interface. In an embodiment of the present disclosure, the electronic device 101 may further include storage devices (or storage media), such as hard drives.

The sensor module 240 may measure physical quantity or detect operation states of the electronic device 101 and convert the measured or detected data to electrical signals. The sensor module 240 may include at least one of the following: a gesture sensor 240A, a gyro sensor 240B, an atmospheric pressure sensor 240C (e.g., a barometer sensor), a magnetic sensor 240D, an acceleration sensor 240E, a grip sensor 240F, a proximity sensor 240G, a color sensor 240H (e.g., red-green-blue (RGB) sensor), a biometric sensor 240I, a temperature/humidity sensor 240J, a luminance sensor 240K, and an ultra-violet (UV) sensor 240M.

The input system 250 may include a touch panel 252, a pen sensor 254 (i.e., a digital pen sensor), a key 256, and an ultrasonic input system 258. The touch panel 252 may detect touches in at least one of the following: capacitive detecting mode, pressure detecting mode, infrared detecting mode, and ultrasonic detecting mode. The touch panel 252 may further include a control circuit. When the touch panel 252 is designed to operate in capacitive detecting mode, the touch panel 252 can detect mechanical/physical touches or proximity of an object. The touch panel 252 may further include a tactile layer. In that case, the touch panel 252 can provide tactile feedback to the user.

The pen sensor 254 (i.e., the digital pen sensor) may be implemented in the same or similar way as receiving a user's touch input or by using a separate recognition sheet. The key 256 may include mechanical buttons, optical keys or a key pad. The ultrasonic input system 258 is a device that can detect sounds via a microphone 288 of the electronic device 101 by using an input tool for generating ultrasonic signals and can determine the data. The ultrasonic input system 258 can detect signals in wireless mode. In an embodiment of the present disclosure, the electronic device 101 may receive a user's inputs from an external system (e.g., a computer or server) via the communication module 220.

The display 260 (e.g., the display 150) may include a panel 262, a hologram unit 264, or a projector 266. The panel 262 may be implemented with a Liquid Crystal Display (LCD), Active Matrix Organic Light Emitting Diodes (AMOLEDs), or the like. The panel 262 may be implemented in a flexible, transparent, or wearable form. The panel 262 may form a single module with the touch panel 252. The hologram unit 264 shows a three-dimensional image in the air using interference of light. The projector 266 may display images by projecting light on a screen. The screen may be placed, for example, inside or outside the electronic device 101. In an embodiment of the present disclosure, the display module 260 may further include a control circuit for controlling the panel 262, the hologram unit 264, or the projector 266.

The interface 270 may include an HDMI 272, a USB 274, an optical interface 276, a D-subminiature (D-sub) 278, and the like. The interface 270 may also be included in the communication interface 160 shown in FIG. 1. The interface 270 may also include a mobile high-media card (MHL) interface, a SD card, a multi-media card (MMC) interface, an infrared data association (IrDA) standard interface, or the like.

The audio module 280 may make conversion between audios and electrical signals. At least part of the components in the audio module 280 may be included in the input/output interface 140 shown in FIG. 1. The audio module 280 may process audios output from/input to, for example, a speaker 282, a receiver 284, earphones 286, a microphone 288, and the like.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), or the like.

The power management module 295 may manage electric power supplying to the electronic device 101. The power management module 295 may include a power management integrated circuit (PMIC), a charger integrated circuit (IC), a battery or fuel gauge, and the like.

The PMIC may be implemented in the form of IC chip or SoC. Charging electric power may be performed in wired or wireless mode. The charger IC may charge a battery, preventing input over-voltage or input over-current from inputting to the battery from a charger. In an embodiment of the present disclosure, the charger IC may be implemented with a wired charging type and/or a wireless charging type. Examples of the wireless charging type of charger IC are a magnetic resonance type, a magnetic induction type, an electromagnetic type, and the like. If the charger IC is implemented with a wireless charging type, the charger IC may include an additional circuit for wireless charging, e.g., a coil loop, a resonance circuit, a rectifier, and the like.

The battery gauge may measure the residual amount of battery 296, the level of voltage, the level of current, temperature during the charge. The battery 296 charges electric power and supplies the electric power to the electronic device 101. The battery 296 may include a rechargeable battery or a solar battery.

The indicator 297 shows states of the electronic device 101 or of the parts (e.g., AP 210), e.g., a booting state, a message state, a recharging state, and the like. The motor 298 converts an electrical signal into a mechanical vibration. Although it is not shown, the electronic device 101 may include a processor for supporting a mobile TV, e.g., a GPU. The mobile TV supporting processor may process media data that comply with standards of digital multimedia broadcasting (DMB), digital video broadcasting (DVB), media flow, and the like.

Each of the elements/units of the electronic device according to the present disclosure may be implemented with one or more components, and be called different names according to types of electronic devices. The electronic device according to the present disclosure may include at least one element described above. The electronic device may be modified in such a way as to: remove part of the elements or include new elements. In addition, the electronic device according to the present disclosure may also be modified in such a way that parts of the elements are integrated into one entity that performs their original functions.

The term "module" according to the various embodiments of the disclosure, indicates, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

Figure 3:
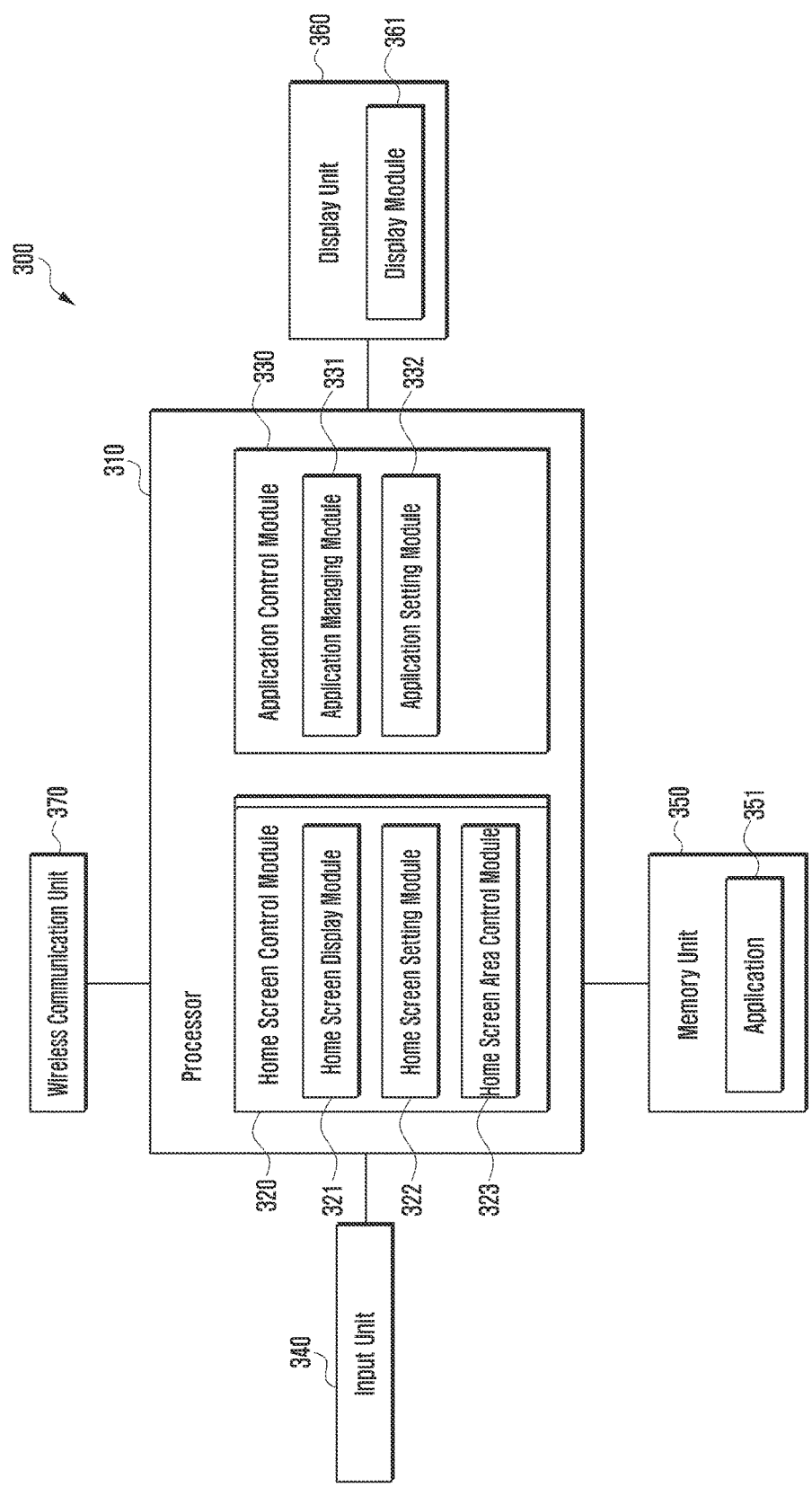

FIG. 3 is a block diagram illustrating an electronic device according to various embodiments of the present disclosure.

Referring to FIG. 3, an electronic device 300 may include a processor 310, an input unit 340, a memory unit 350, a display unit 360, and a wireless communication unit 370.

The processor 310 may include a home screen control module 320 and an application control module 330. The home screen control module 320 may include a home screen display module 321, a home screen setting module 322, and a home screen area control module 323.

The home screen display module 321 may transmit graphical components, including widgets, icons, or any other equivalent, of applications to the display unit 360 to display the graphical components on the home screen.

The home screen setting module 322 may manage setting information about graphical components, such as widgets and icons of applications, assigned to the home screen. In addition, the home screen setting module 322 may determine which page of the home screen contains graphical components, such as widgets and icons of which application. Moreover, the home screen setting module 322 may set and manage attribute information about graphical components, e.g., sizes of widgets and icons, of existing applications.

The home screen area control module 323 may identify a displayable area (or referred to as an empty area) of the home screen so as to display graphical components, such as widgets and icons of applications, on the home screen. In addition, the home screen area control module 323 may determine whether to arrange, in the displayable area, at least one of graphical components, such as widgets and icons of applications, to be displayed.

The application control module 330 may include an application managing module 331 and an application setting module 332.

The application managing module 331 may manage a list of displayable graphical components, such as widgets and icons of applications that exist in the electronic device 300.

The application setting module 332 may manage setting information about graphical components, such as widgets and icons of applications.

The input unit 340 may be the input device 250 shown in FIG. 2. The memory unit 350 may be the memory 230 shown in FIG. 2. The memory unit 350 may store therein an application 351. This application 351 may be the application 134 shown in FIG. 1. The application 351 may contain at least one graphical component, such as a widget and an icon.

The display unit 360 may include a display module 361. The display module 361 may be the display module 260 shown in FIG. 2. The wireless communication unit 370 may be the communication module 220 shown in FIG. 2.

The electronic device 300 according to various embodiments of this disclosure may include the display unit 360 including the display module 361 configured to display a home screen having a plurality of pages and to display graphical components, having widgets and icons, of applications, and the memory unit 350 configured to store therein the applications and the graphical components. The electronic device 300 may further include the processor 310 configured to recognize an editing gesture input with regard to a selected application icon, to activate an editing mode in response to the editing gesture input, to control the display module to display an application list corresponding to the selected application icon in the editing mode, to recognize a selection of at least one of graphical components, including widgets and icons, arranged in the displayed application list, and to control the display module to display the at least one selected graphical component on at least one page of the plurality of pages of the home screen.

According to an embodiment of the present disclosure, the processor 310 may be further configured to recognize the editing gesture input after recognizing a selection of the application icon on the home screen.

According to an embodiment of the present disclosure, the processor 310 may be further configured to recognize the editing gesture input after recognizing a selection of the application icon in an application collection and then recognizing an entry of the selected application icon from the application collection to the home screen.

According to an embodiment of the present disclosure, the processor 310 may be further configured, when activating the editing mode, to control the display module to display an editing screen on the home screen in an overlap form.

According to an embodiment of the present disclosure, the processor 310 may be further configured to recognize an empty area in the page of the home screen, to recognize a size-defining gesture input for defining a size of a graphical component to be displayed on the page, to determine whether the empty area is equal to or greater than the defined size, and if the empty area is greater than or equal to the defined size, to control the display module to display the application list in which at least one graphical component having a size less than or equal to the defined size is arranged.

According to an embodiment of the present disclosure, the processor 310 may be further configured to determine whether there is a page containing therein at least one of graphical components of an application which is identical to or associated with a particular application corresponding to the selected application icon, to determine weight values of the pages when the page is two or more pages, to determine priorities based on the weight values, and to control the display module to display the at least one selected graphical component on a specific page having the highest priority.

According to an embodiment of the present disclosure, the processor 310 may be further configured to determine the weight values depending on the number of the graphic components contained in each page.

According to an embodiment of the present disclosure, the processor 310 may be further configured to determine the weight values depending on a size of an empty area in each page.

According to an embodiment of the present disclosure, the processor 310 may be further configured to recognize that the selected application icon is dragged to a page for performing a particular function, to determine whether an application corresponding to the selected application icon performs the particular function offered by the page, to control the display module to display user interfaces (UIs) associated with the particular function in the application list when the application performs the particular function, to recognize a selection of one of the UIs displayed in the application list, and to control the display module to display the selected UI on the page.

Figure 4:
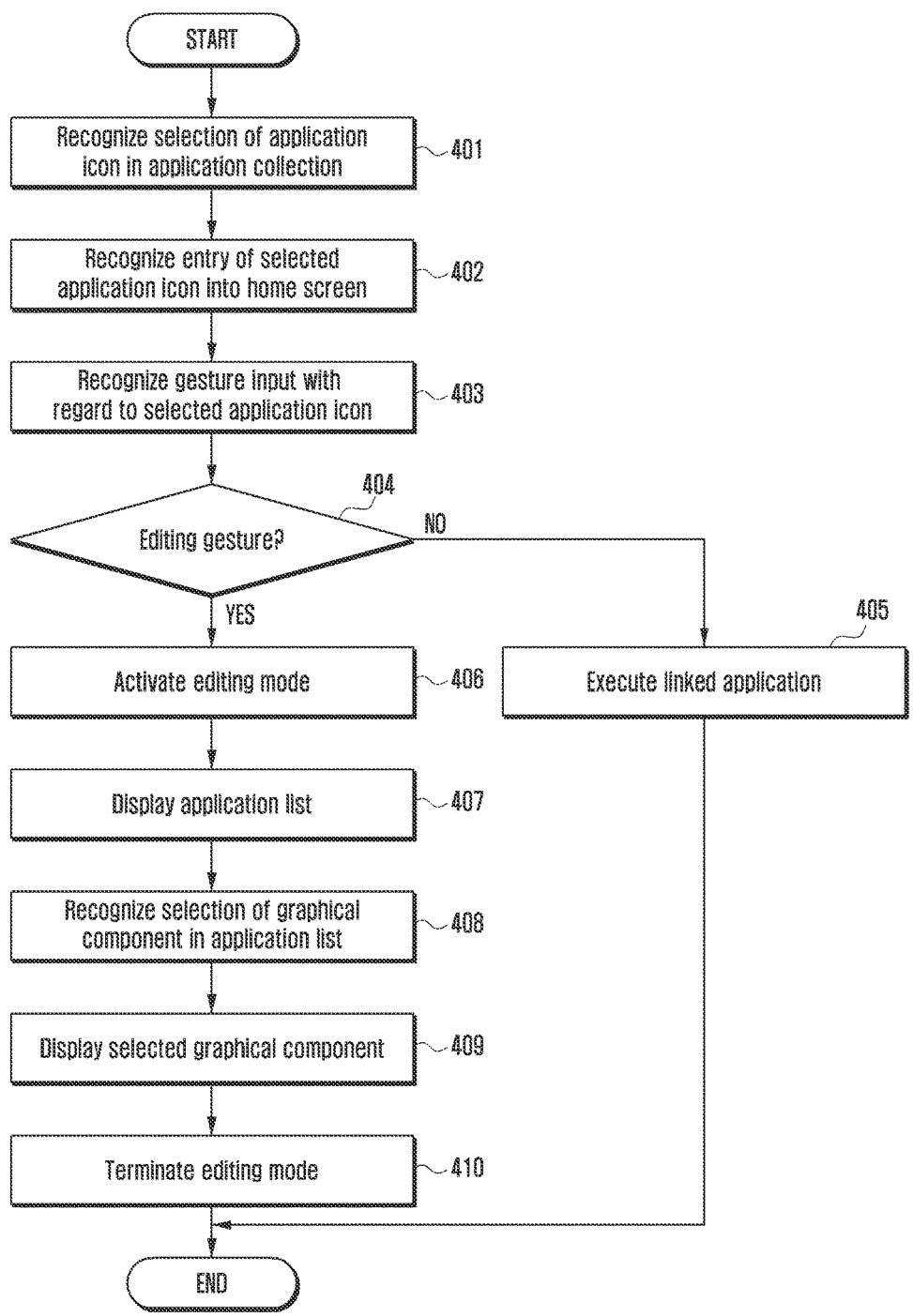
FIG. 4 is a flowchart illustrating a method for displaying a widget and an icon of an application according to various embodiments of the present disclosure.

FIG. 4 is a flowchart illustrating a method for displaying a widget and an icon of an application according to various embodiments of the present disclosure.

Referring to FIG. 4, at operation 401, the processor 310 may recognize that a user selects a specific icon linked to a specific application (herein, this icon may be also referred to as an application icon).

At operation 402, the processor 310 may further recognize a user's gesture (e.g., a long press, a double tap, a drag and drop, and the like) for entering the home screen with regard to the selected icon. In response to the recognized gesture, the processor 310 may display the selected icon on at least one page of the home screen.

At operation 403, the processor 310 may recognize a user's gesture with regard to the displayed icon from the home screen. Thereafter, at operation 404, the processor 310 may determine whether the recognized gesture is a predefined editing gesture. If the recognized gesture is not an editing gesture, the processor 310 may perform operation 405. Namely, at operation 405, the processor 310 may regard the recognized gesture of operation 403 as a gesture for invoking a linked application and then execute the application. If it is determined at operation 404 that the recognized gesture is an editing gesture, the processor 310 may activate an editing mode at operation 406. This editing mode may include invoking and displaying an editing screen to be used for editing the home screen. Such an editing screen may be displayed on the home screen in an overlap or overlay form.

At operation 407, by controlling the display module 361, the processor 310 may display an application list corresponding to the selected application icon on the editing screen in the editing mode.

At operation 408, the processor 310 may recognize that a user selects at least one of graphical components, including widgets and icons, arranged in the displayed application list.

At operation 409, by controlling the display module 361, the processor 310 may display the at least one selected graphical component on at least one page of the home screen. In addition, at operation 410, the processor 310 may terminate the editing mode.

FIG. 5 illustrates screenshots illustrating a process of displaying a widget and an icon of an application according to various embodiments of the present disclosure.

Referring to FIG. 5, the processor 310 may recognize a user's selection with regard to at least one icon 515 among application icons displayed on a home screen 521. Further, the processor 310 may recognize a specific gesture (i.e., an editing gesture input) for activating an editing mode with regard to the selected application icon 515. For example, the editing gesture input may be a long press, a double tap, or the like.

In the editing mode, the processor 310 may display an editing screen 520. Then the processor 310 may recognize a user's gesture with regard to the selected application icon 515 (e.g., a gesture of dragging the icon 515 to an application list icon 524 and then dropping the icon 515).

In response to the above gesture, the processor 310 may display an application list on the home screen 530 in an overlap or overlay form. This application list may contain the selected application icon 515 and widgets 525 of a specific application linked to the selected application icon 515.

Figure 6A:
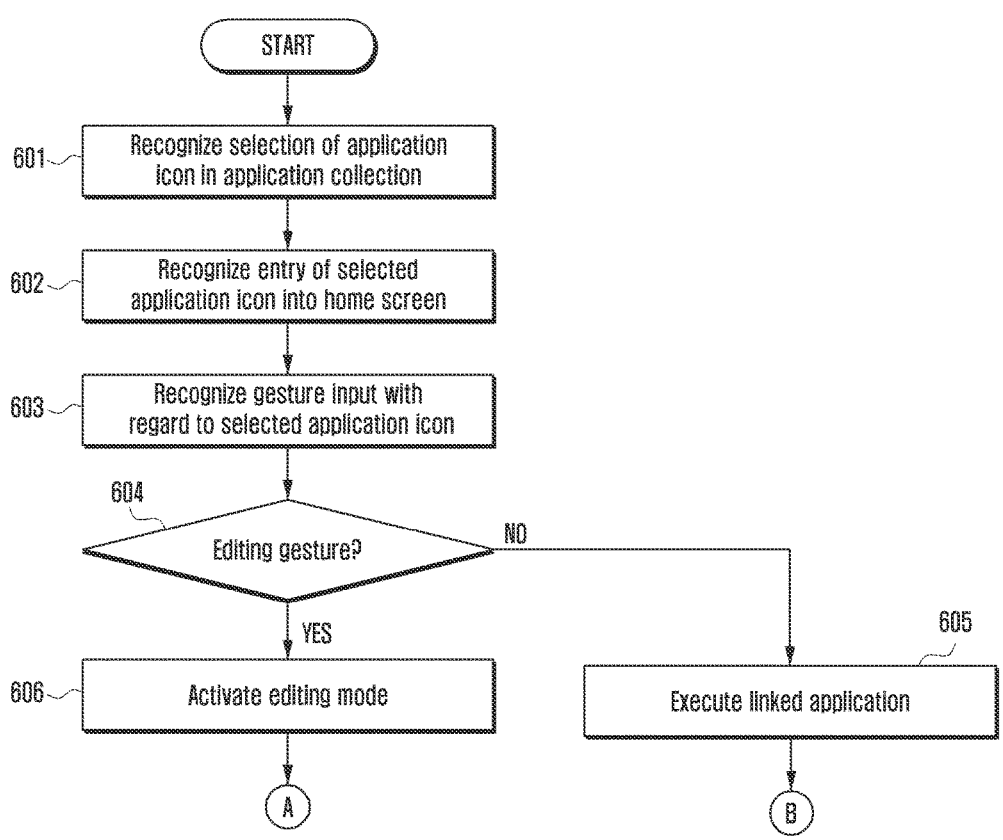
FIGS. 6A and 6B are flowcharts illustrating a method for displaying a widget and an icon of an application according to various embodiments of the present disclosure.
Figure 6B:
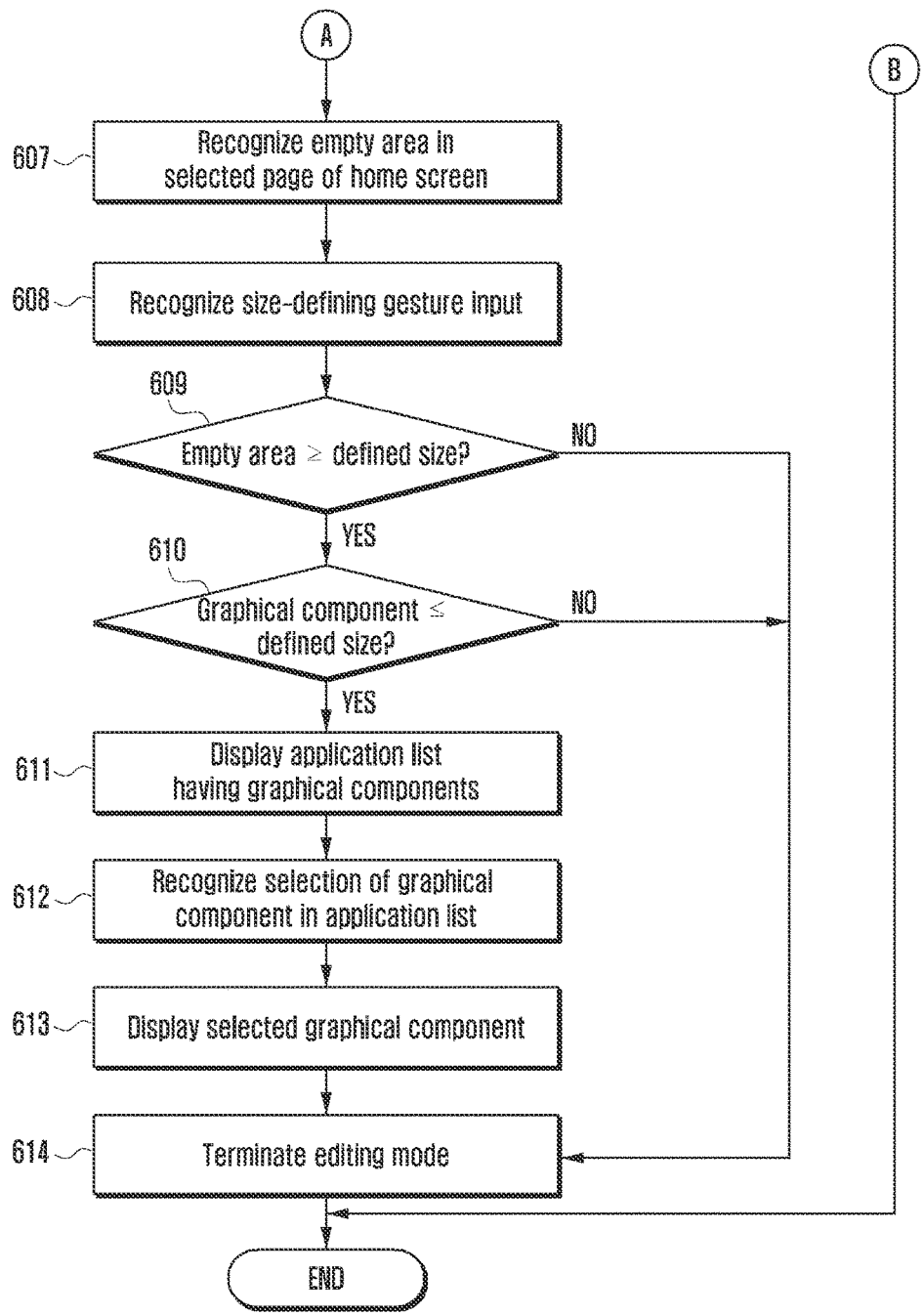

FIGS. 6A and 6B are flowcharts illustrating a method for displaying a widget and an icon of an application according to various embodiments of the present disclosure.

Referring to FIG. 6A, at operation 601, the processor 310 may recognize that a user selects a certain application icon linked to a certain application. In addition, at operation 602, the processor 310 may further recognize a user's gesture for entering the home screen with regard to the selected application icon. In response to the recognized gesture, the processor 310 may display the selected application icon on at least one page of the home screen.

At operation 603, the processor 310 may recognize a user's gesture with regard to the displayed icon from the home screen. Thereafter, at operation 604, the processor 310 may determine whether the recognized gesture is a predefined editing gesture. If the recognized gesture is not an editing gesture, at operation 605 the processor 310 may regard the recognized gesture of operation 603 as a gesture for invoking a linked application and then execute the application. If the recognized gesture is an editing gesture, the processor 310 may activate an editing mode at operation 606. This editing mode may include invoking and displaying an editing screen to be used for editing the home screen. The editing screen may be displayed on the home screen in an overlap or overlay form.

Referring to FIG. 6B, at operation 607, the home screen area control module 323 of the processor 310 may recognize an empty area in a page that contains the selected and displayed application icon. Herein, such an empty area refers to a space in which graphical components, such as widgets and icons, are not displayed at all.

At operation 608, the processor 310 may recognize a user's gesture for defining a size of a graphical component to be displayed on the page. Herein, this gesture will be referred to as a size-defining gesture input. This gesture may be made crosswise, lengthwise, diagonally, or in any other direction. At operation 609, the home screen area control module 323 may determine whether the empty area recognized at operation 607 is greater than or equal to the size defined at operation 608. If the home screen area control module 323 determines that the empty area is less than the defined size, the processor 310 may terminal the editing mode at operation 614. Otherwise, if the home screen area control module 323 determines that the empty area is greater than or equal to the defined size, the processor 310 may perform operation 610.

At operation 610, the application managing module 331 of the processor 310 may determine whether a specific application linked to the application icon to which the size-defining gesture input is performed has at least one graphical component having a size less than or equal to the defined size. If this is not such a graphical component, the application managing module 331 may terminate the editing mode at operation 614. Otherwise, if there is at least one graphical component having a size less than or equal to the defined size, the processor 310 may display at operation 611 the application list in which such a graphical component is arranged.

At operation 612, the processor 310 may recognize that a user selects at least one of graphical components arranged in the displayed application list. At operation 613, by controlling the display module 361, the processor 310 may display the at least one selected graphical component on at least one page of the home screen. In addition, at operation 614, the processor 310 may terminate the editing mode.

Figure 7:
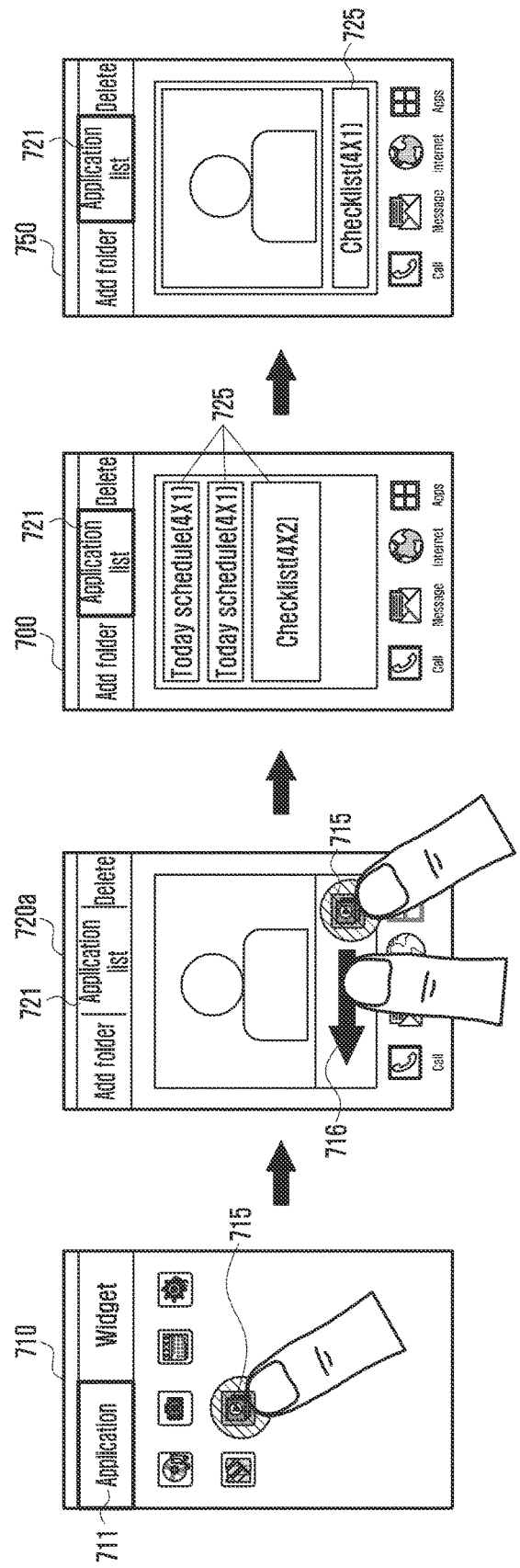
FIG. 7 illustrates screenshots illustrating a process of displaying a widget and an icon of an application according to various embodiments of the present disclosure.

FIG. 7 illustrates screenshots illustrating a process of displaying a widget and an icon of an application according to various embodiments of the present disclosure.

Referring to FIG. 7, the processor 310 may display an application collection screen 710 associated with an application item 711. The processor 310 may also display another application collection screen associated with a widget item. In the application collection screen 710, the processor 310 may recognize that a user selects a specific application icon 715. Such application icons arranged in the application collection screen 710 may be icons linked to applications downloaded or stored.

The processor 310 may activate an editing mode in response to a user's predefined gesture. This gesture may be a long press, a double tap, or the like. After recognizing a user's editing gesture, the processor 310 may display the specific icon 715 selected in the application item 711 at a certain area of an editing screen 720a. For example, the processor 310 may display the selected icon 715 at the lower right corner of the editing screen as shown. Then the processor 310 may recognize a user's gesture (e.g., a gesture of dragging the icon 715 in an arrow direction 716). This gesture may be a size-defining gesture as discussed above.

The processor 310 may display an application list 721 in which graphical components, such as widgets 725, having a size defined by the above size-defining gesture are arranged in a screen 700. When a user selects at least one of such widgets 725, the processor 310 may recognize this selection and display the selected widgets 725 at a specific position in a screen 750 where the size-defining gesture occurs.

Figure 8A:
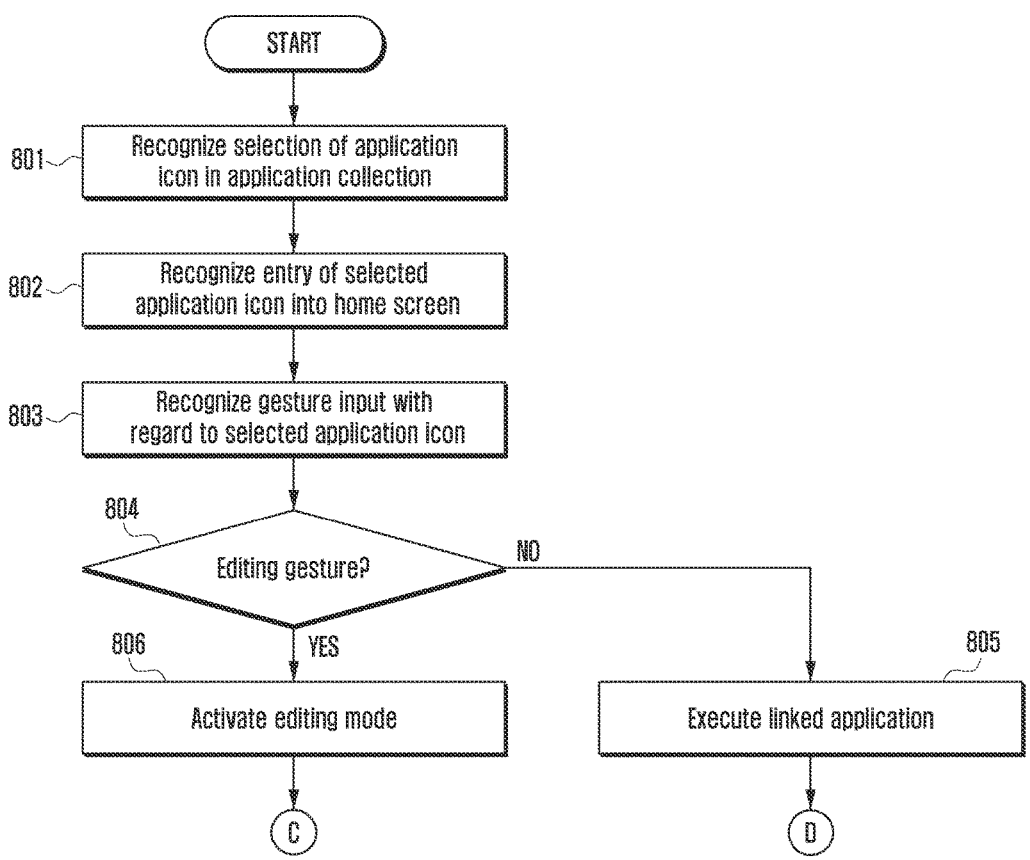
FIGS. 8A and 8B are flowcharts illustrating a method for displaying a widget and an icon of an application according to various embodiments of the present disclosure.
Figure 8B:
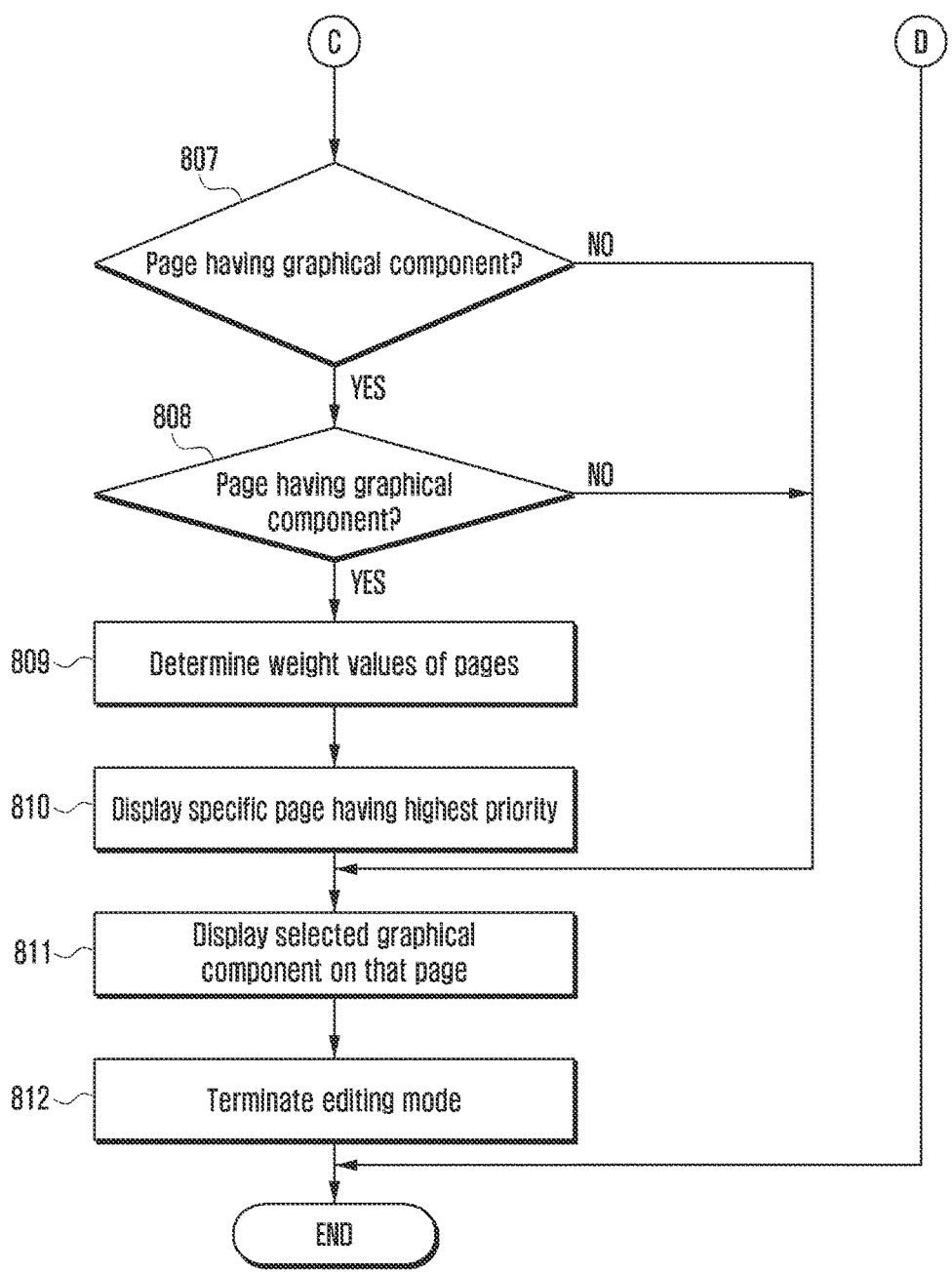

FIGS. 8A and 8B are flowcharts illustrating a method for displaying a widget and an icon of an application according to various embodiments of the present disclosure.

Referring to FIG. 8A, at operation 801, the processor 310 may recognize that a user selects a certain application icon linked to a certain application. In addition, at operation 802, the processor 310 may further recognize a user's gesture for entering the home screen with regard to the selected application icon. In response to the recognized gesture, the processor 310 may display the selected application icon on at least one page of the home screen. At operation 803, the processor 310 may recognize a user's gesture with regard to the displayed icon from the home screen.

Thereafter, at operation 804, the processor 310 may determine whether the recognized gesture is a predefined editing gesture. If the recognized gesture is not an editing gesture, at operation 805 the processor 310 may regard the recognized gesture of operation 803 as a gesture for invoking a linked application and then execute the application. If the recognized gesture is an editing gesture, the processor 310 may activate an editing mode at operation 806. This editing mode may include invoking and displaying an editing screen to be used for editing the home screen. The editing screen may be displayed on the home screen in an overlap or overlay form.

Referring to FIG. 8B, at operation 807, the home screen setting module 322 of the processor 310 may determine whether there is a page that contains therein at least one of graphical components of an application which is identical to or associated with a particular application corresponding to the selected application icon of operation 801.

Here, an associated application may indicate any application having a similar function, such as a bank application. If it is determined at operation 807 that the above-discussed page does not exist, the home screen setting module 322 may select and display at operation 811 at least one of graphical components, such as widgets and icons of an application, on a specific page of the home screen selected at operation 802. Otherwise, if it is determined at operation 807 that the above-discussed page exists, the home screen setting module 322 may further determine at operation 808 whether such pages, i.e., having at least one graphical component of an identical or associated application, are two or more. If such a page is single, the home screen setting module 322 may perform operation 811 discussed above. If such pages are two or more, the home screen setting module 322 may determine weight values of such pages at operation 809. For example, the home screen setting module 322 may determine the weight values depending on the number of graphic components contained in each page or depending on a size of an empty area in each page. Additionally, the weight values may be determined depending on the number of applications, the number of access to each page, or the like. At operation 810, the processor 310 may identify priorities of such pages, based on the weight values, and display a specific page having the highest priority. Thereafter, at operation 811, the processor 310 may display the at least one selected graphical component on the specific page having the highest priority. In addition, at operation 812, the processor 310 may terminate the editing mode.

According to another embodiment of the present disclosure, when it is recognized that the selected application icon is dragged to a page for performing a particular function or having a particular form or feature (e.g., a page for offering a magazine UI, a card UI, and the like), the processor 310 may perform the followings. First, the processor 310 may recognize a user's selection with regard to at least one of icons displayed on the home screen. In addition, the processor 310 may recognize a user's gesture (e.g., a drag and drop to a specific page) with regard to the selected icon. Then the processor 310 may display information, offered by a corresponding application, on the page in the form of a specific UI. Namely, the processor 310 may determine whether an application corresponding to the selected application icon offers the specific UI of the page. If so, the processor 310 may display such UIs in the application list. Then the processor 310 may display a selected one of such UIs on the page.

The method for constructing the home screen of the electronic device according to various embodiments of this disclosure may include recognizing an editing gesture input with regard to a selected application icon, activating an editing mode in response to the editing gesture input, displaying an application list corresponding to the selected application icon in the editing mode, recognizing a selection of at least one of graphical components, including widgets and icons, arranged in the displayed application list, and displaying the at least one selected graphical component on at least one page of the home screen.

According to an embodiment of the present disclosure, the editing gesture input recognizing operation may be performed after recognizing a selection of the application icon on the home screen.

According to an embodiment of the present disclosure, the editing gesture input recognizing operation may be performed after recognizing a selection of the application icon in an application collection and recognizing an entry of the selected application icon from the application collection to the home screen.

According to an embodiment of the present disclosure, the editing mode activating operation may include displaying an editing screen on the home screen in an overlap form.

According to an embodiment of the present disclosure, the application list displaying operation may include recognizing an empty area in the page of the home screen, recognizing a size-defining gesture input for defining a size of a graphical component to be displayed on the page, determining whether the empty area is greater than or equal to the defined size, and if the empty area is greater than or equal to the defined size, displaying the application list in which at least one graphical component having a size less than or equal to the defined size is arranged.

According to an embodiment of the present disclosure, the selected graphical component displaying operation may include determining whether there is a page containing therein at least one of graphical components of an application which is identical to or associated with a particular application corresponding to the selected application icon, if the page is two or more pages, determining weight values of the pages, determining priorities based on the weight values, and displaying the at least one selected graphical component on a specific page having the highest priority.

According to an embodiment of the present disclosure, the weight values may be determined depending on the number of the graphic components contained in each page.

According to an embodiment of the present disclosure, the weight values may be determined depending on a size of an empty area in each page.

According to an embodiment of the present disclosure, the editing gesture input recognizing operation may include recognizing that the selected application icon is dragged to a page for performing a particular function, and the selected graphical component displaying operation may include determining whether an application corresponding to the selected application icon performs the particular function offered by the page, if the application performs the particular function, displaying UIs associated with the particular function in the application list, recognizing a selection of one of the UIs displayed in the application list, and displaying the selected UI on the page.

According to various embodiments disclosed hereinbefore, the method for constructing the home screen and the electronic device using the method may allow a user to determine graphical components, such as widgets and icons of applications and to simply display selected graphical components on the home screen.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or programming module of the present disclosure may include at least one of the aforementioned components with omission of some components or addition of other components. The operations of the modules, programming modules, or other components may be executed in series, in parallel, recursively, or heuristically. In addition, some operations may be executed in different order, omitted, or extended with other operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for constructing a home screen of an electronic device, the method comprising:
recognizing an editing gesture input with regard to a selected application icon;
activating an editing mode in response to the editing gesture input;
displaying an application list corresponding to the selected application icon in the editing mode;
recognizing a selection of at least one of graphical components, comprising widgets and icons, arranged in the displayed application list; and
displaying the at least one selected graphical component on at least one page of the home screen.

2. The method of claim 1, wherein the recognizing of the editing gesture input is performed after recognizing a selection of the application icon on the home screen.

3. The method of claim 1, wherein the recognizing of the editing gesture input is performed after recognizing a selection of the application icon in an application collection and recognizing an entry of the selected application icon from the application collection to the home screen.

4. The method of claim 1, wherein the activating of the editing mode comprises displaying an editing screen on the home screen in an overlap form.

5. The method of claim 1, wherein the displaying of the application list comprises:
recognizing an empty area in the page of the home screen;
recognizing a size-defining gesture input for defining a size of a graphical component to be displayed on the page;
determining whether the empty area is greater than or equal to the defined size; and
displaying, if the empty area is greater than or equal to the defined size, the application list in which at least one graphical component having a size less than or equal to the defined size is arranged.

6. The method of claim 1, wherein the displaying of the at least one selected graphical component comprises:
determining whether there is a page containing therein at least one of graphical components of an application which is identical to or associated with a particular application corresponding to the selected application icon;
determining, if the page is two or more pages, weight values of the pages;
determining priorities based on the weight values; and
displaying the at least one selected graphical component on a specific page having the highest priority.

7. The method of claim 6, wherein the weight values are determined depending on the number of the graphic components contained in each page.

8. The method of claim 6, wherein the weight values are determined depending on a size of an empty area in each page.

9. The method of claim 1,
wherein the recognizing of the editing gesture input comprises recognizing that the selected application icon is dragged to a page for performing a particular function, and
wherein the displaying of the at least one selected graphical component comprises:
determining whether an application corresponding to the selected application icon performs the particular function offered by the page;
displaying, if the application performs the particular function, user interfaces (UIs) associated with the particular function in the application list;
recognizing a selection of one of the UIs displayed in the application list; and
displaying the selected UI on the page.

10. An electronic device comprising:
a display unit comprising a display module configured:
to display a home screen comprising a plurality of pages, and
to display graphical components, comprising widgets and icons, of applications;
a memory unit configured to store therein the applications and the graphical components; and
a processor configured:
to recognize an editing gesture input with regard to a selected application icon,
to activate an editing mode in response to the editing gesture input,
to control the display module to display an application list corresponding to the selected application icon in the editing mode,
to recognize a selection of at least one of graphical components, comprising widgets and icons, arranged in the displayed application list, and
to control the display module to display the at least one selected graphical component on at least one page of the plurality of pages of the home screen.

11. The electronic device of claim 10, wherein the processor is further configured to recognize the editing gesture input after recognizing a selection of the application icon on the home screen.

12. The electronic device of claim 10, wherein the processor is further configured to recognize the editing gesture input after recognizing a selection of the application icon in an application collection and then recognizing an entry of the selected application icon from the application collection to the home screen.

13. The electronic device of claim 10, wherein the processor is further configured to control, when activating the editing mode, the display module to display an editing screen on the home screen in an overlap form.

14. The electronic device of claim 10, wherein the processor is further configured:
to recognize an empty area in the page of the home screen,
to recognize a size-defining gesture input for defining a size of a graphical component to be displayed on the page,
to determine whether the empty area is greater than or equal to the defined size, and
to control, if the empty area is greater than or equal to the defined size, the display module to display the application list in which at least one graphical component having a size less than or equal to the defined size is arranged.

15. The electronic device of claim 10, wherein the processor is further configured:
to determine whether there is a page containing therein at least one of graphical components of an application which is identical to or associated with a particular application corresponding to the selected application icon,
to determine weight values of the pages when the page is two or more pages,
to determine priorities based on the weight values, and
to control the display module to display the at least one selected graphical component on a specific page having the highest priority.

16. The electronic device of claim 15, wherein the processor is further configured to determine the weight values depending on the number of the graphic components contained in each page.

17. The electronic device of claim 15, wherein the processor is further configured to determine the weight values depending on a size of an empty area in each page.

18. The electronic device of claim 10, wherein the processor is further configured:
to recognize that the selected application icon is dragged to a page for performing a particular function,
to determine whether an application corresponding to the selected application icon performs the particular function offered by the page,
to control the display module to display user interfaces (UIs) associated with the particular function in the application list when the application performs the particular function,
to recognize a selection of one of the UIs displayed in the application list, and
to control the display module to display the selected UI on the page.

19. At least one non-transitory computer readable storage medium for storing a computer program of instructions configured to be readable by at least one processor for instructing the at least one processor to execute a computer process for performing the method of claim 1.

* * * * *